United States Patent [19]

Antognini et al.

[11] Patent Number: 4,551,665

[45] Date of Patent: Nov. 5, 1985

[54] METHOD OF AND A DEVICE FOR CONTROLLING A STEPPING MOTOR

[75] Inventors: Luciano Antognini, La Chaux-de-Fonds, Switzerland; Yves Guérin, St. Louis, France

[73] Assignee: ETA S.A. Fabriques D'Ebauches, Switzerland

[21] Appl. No.: 636,426

[22] Filed: Jul. 31, 1984

[30] Foreign Application Priority Data

Aug. 12, 1983 [CH] Switzerland ........................ 4412/83

[51] Int. Cl.[4] .............................................. H02K 29/04

[52] U.S. Cl. .................................... 318/696; 318/685; 368/157

[58] Field of Search ................ 318/685, 696; 368/157, 368/217

[56] References Cited

U.S. PATENT DOCUMENTS 4,346,463 8/1982 Tu Xuan et al. .................... 368/157

4,353,021 10/1982 Watanabe et al. .................. 318/696

*Primary Examiner*—William M. Shoop, Jr.

*Assistant Examiner*—Saul M. Bergmann

*Attorney, Agent, or Firm*—Pollock, Vande Sande & Priddy

[57] ABSTRACT

The method involves supplying to the motor drive pulses generated by a control circuit, determining by means of a measurement circuit a physical magnitude representative of the motion of the rotor, interrupting the drive pulse at a given instant defined by a calculating circuit according to the time taken by the physical magnitude to reach, in a comparator, a reference level, controlling by means of a missed step detecting circuit whether or not the rotor has effected a step, retrieving if need be a non-effected step, summing the number of missed or non-effected steps in a counting circuit, and modifying in a reference circuit the reference level depending on the number of steps that have been missed in a given period of time.

The device for putting this method into operation enables the motor to operate under optimal security and energy consumption conditions and can be used to advantage in timepieces.

17 Claims, 9 Drawing Figures

METHOD OF AND A DEVICE FOR CONTROLLING A STEPPING MOTOR

BACKGROUND OF THE INVENTION

This invention relates to a method of and a device for controlling a stepping motor and is particularly suited to the watchmaking field.

In electronic analogue-display watches having a stepping motor to drive the display components, most of the energy supplied by the electric source, usually a battery, is used up by the motor. It is therefore important to reduce as much as possible the consumption of the motor in order either to increase the lifetime of the battery or, for a given lifetime, to diminish its volume, the space available inside a timepiece being very limited.

In most watches currently on the market, the duration of the drive pulses that are fed at regular intervals to the motor is fixed. This duration, usually 7.8 ms, is so chosen that the motor will work properly even in the worst conditions, i.e. with a low battery voltage, while driving the calendar mechanism or when the watch is subjected to shocks, external magnetic fields, etc. As these adverse conditions occur only rarely, the motor is oversupplied most of the time.

A known method of reducing the energy consumption of a motor consists in applying to it normal drive pulses of reduced duration, e.g. 3.9 ms, but long enough to ensure proper operation under optimal conditions, and in providing a device which, after each pulse, detects whether the motor has rotated or not. When no rotation occurs, the detection device causes a correcting pulse of long duration to be issued thus enabling the motor to effect the missed step. Although this system is a definite improvement over the case where the motor only receives pulses of long duration, it is not satisfactory since, whenever the motor fails to rotate in response to a normal pulse, the energy of this pulse is completely lost and the duration of the corrective pulse is usually far greater than is needed for the motor to effect its step.

Other systems use means able to detect changes in the motor load and to switch the duration or the amplitude of the drive pulses to a greater value whenever a load increase is detected. Such systems, as with the previous one, are in fact only safety devices that simply enable the motor to be issued with increased but often excessive energy when necessary.

The energy consumption of the motor can only in fact be substantially reduced by providing more sophisticated control devices that enable the energy of the drive pulses to be adapted to the momentary load on the motor and to the supply voltage.

One proposed solution has been to provide a pulse generating circuit capable of producing pulses of different durations, along with a device able to detect, as described above, the rotation of the motor or the absence of such rotation, and to reduce progressively the duration of the pulses issued to the motor until a missed or non-effected step is detected. A correction pulse of maximum duration is then issued to the motor and the energy of the normal drive pulses is adjusted to the next higher value. If the following step fails, a further incrementation is performed. Otherwise the value is maintained for a while. If the motor rotates normally during this time, the duration of the pulses is reduced again. With such a solution, a permanent and rapid adjustment of the drive pulses to the load of the motor is not possible: this adjustment in fact only proceeds from an average. Besides, as with the first system described above, the issuance of correction pulses when the motor fails to rotate involves greater energy consumption than necessary.

Some systems do enable the energy of the drive pulses to be permanently adjusted in relation to the motor load and to the battery voltage. These systems include means able to measure, while the drive pulse is applied, a parameter representative of the position or speed of the rotor, and to interrupt the pulse at an instant that is set in dependence on the time taken by the measured parameter to reach a predetermined reference level corresponding to the instant when the rotor has effected its step or has at least rotated by an angle or reached a speed sufficient to complete the step. Such a system is indeed more efficient. In practice, however, the dispersion and the variations of the characteristics of the motor and of certain components of its control circuit must be taken into account in setting the reference level. The chosen value therefore does not correspond to minimum consumption.

SUMMARY OF THE INVENTION

A main object of this invention is to eliminate this drawback or in other words to reduce as much as possible the energy consumption of the motor while ensuring proper operation even under the worst conditions.

According to one aspect of the invention there is provided a method of controlling a stepping motor having a rotor and a coil arranged to receive from a control device associated with the motor normal drive pulses for driving the rotor when the control device is subjected to a voltage, said method comprising measuring during each normal drive pulse a physical magnitude representative of the motion of the rotor, interrupting said pulse at an instant determined by the time taken by the physical magnitude to reach a reference level, and, additionally, detecting whether or not the rotor has rotated in response to the normal drive pulses and altering the reference level according to the information provided by such detection.

The reference level may thus be adapted to the individual characteristics of any one motor and to those of the control device associated with this motor thereby to achieve optimal overall efficiency, without however adversely affecting the reliability of the motor.

In one particular form of the method according to the invention, the reference level is adjustable step by step between minimum and maximum values and is incremented by one step whenever N steps not effected by the rotor in response to normal drive pulses have been detected over a fixed time span, N being an integer greater than or equal to 1.

Preferably, the steps not effected by the rotor in response to normal drive pulses are retrieved by applying to the coil of the motor correction drive pulses of sufficient duration to ensure the rotation of the rotor.

According to a second aspect of the invention, there is provided a control device, which comprises signal generating means for producing an output signal each time the rotor has to effect a step, control means for applying normal drive pulses to the coil of the motor in response to the output signals issued by the signal generating means, means couplable to the motor for measuring during each normal drive pulse a physical magnitude characteristic of the motion of the rotor and for issuing a measurement signal representative of this physical magnitude, means for producing a reference signal corresponding to the reference level, means for supplying a signal of comparison between the measurement signal and the reference signal, means for receiving the comparison signal and for acting on the control means to interrupt the normal drive pulse at a particular instant determined by the time taken by the physical magnitude to reach the reference level, and means for detecting whether or not the rotor has rotated in response to the normal drive pulses, the reference signal producing means being adapted to modify the value of this signal according to the information supplied by the detection means.

DETAILED DESCRIPTION

Figure 1:
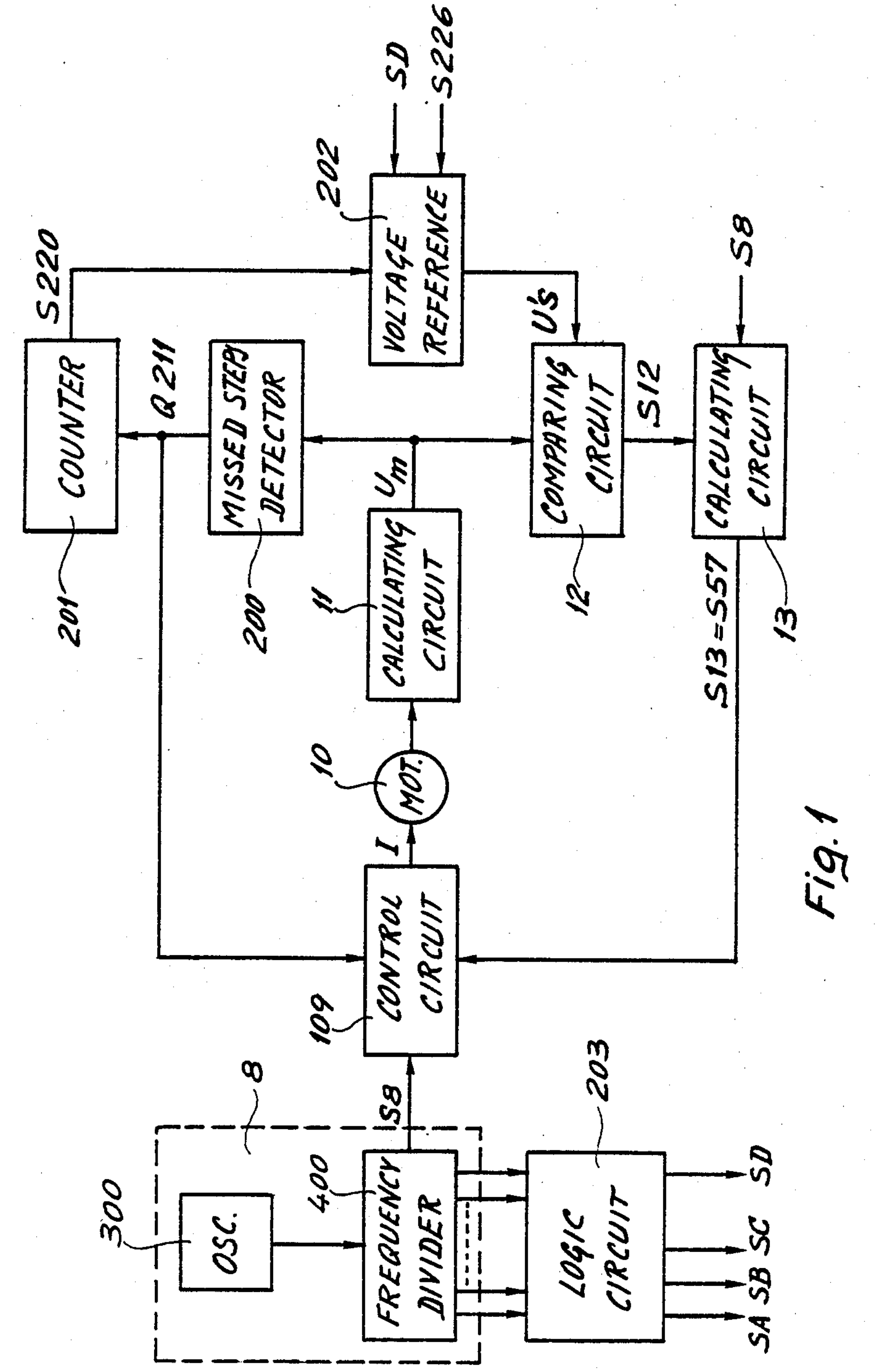
FIG. 1 is a block diagram of one form of embodiment of the control device according to the invention wherein the parameter chosen to adapt the duration of the drive pulses to the load of the motor is the voltage induced in the coil of the motor by the motion of the rotor.

A stepping motor control system in which the voltage that is induced in the coil of the motor by the motion of the rotor is measured and compared to a threshold or reference level in order to adapt the duration of the drive pulses to the instantaneous load of the motor has already formed the subject of a European patent application filed on 21 January 1982 in the name of ASULAB SA and published under No. 0060 806, corresponding to U.S. Pat. No. 4,446,413. Of course, as in other known systems of the same kind wherein use is made of other parameters than the induced voltage to control the interruption of the drive pulses, the threshold level is fixed. Some parts of the device described in EP Specification No. 0060806 have however been incorporated unchanged or slightly modified in the form of embodiment being described here to illustrate the invention.

Reference will therefore be made in the following description to EP Specification No. 0060806 in order to make comparisons and to avoid having again to describe in detail circuits or parts of circuits already described in said specification.

To avoid possible confusion, the elements of the known device which are also to be found in the form of embodiment being described here are given the same references as in EP Specification No. 0060806. For example, the induced voltage measuring circuit referenced 11 in FIG. 4 of EP Specification No. 0060806 has been given the same reference number in the present specification. The same applies to circuit 13 for measuring the duration of the drive pulses. It should be noted that the same applies to the signals that are equivalent in both cases.

But elements fulfilling the same function in the device described here as in the known device and which have had to be modified, are referenced in the present specification with a number that has been incremented by 100 with respect to the earlier case. For example, the two-input AND gate 43, which supplies the control transistors of the motor shown in FIG. 12 of EP Specification No. 0060806, becomes a three-input AND gate 143 in this specification, both gates basically fulfilling the same function.

Finally, any element appearing only in this specification is referenced with a number greater than 200.

The control device about to be described with reference to FIG. 1, which corresponds to FIG. 4 of EP Specification No. 0060806, is designed to be fitted in an electronic watch having a seconds-hand.

This device comprises a periodic signal generating circuit 8 made up of a quartz oscillator 300 which produces a signal having a frequency substantially equal to 32768 Hz and of a frequency divider 400 which, after dividing the frequency of the oscillator by fifteen binary stages and shaping the wave, issues on its output, which is also that of circuit 8, a signal S8 of 1 Hz made up of short pulses having a duration equal to for example the period of the oscillator signal, i.e. roughly 30 $\mu$s.

A combinative logic circuit 203 is connected to the several outputs of the binary stages of frequency divider 400 via a series of connections to produce three logic signals SA, SB and SC which are necessary for the operation of the device and whose shape will be described later. Circuit 203, which also serves to divide the output signal of the last binary stage of the frequency divider 400 and to produce periodically, e.g. every hour, a fourth signal SD the purpose of which will become apparent later, can readily be built by the man of the art. It will therefore not be described in detail here.

A control circuit 109, having a function similar to that of circuit 9 in EP Specification No. 0060806, has a first input connected to the output of frequency divider 400, that which issues signal S8. The output of circuit 109 issues drive pulses I to a stepping motor 10. A second input of circuit 109 receives a stopping signal S13 for iterrupting drive pulse I, as described in EP Specification No. 0060806. A third input of circuit 109 receives a correcting signal Q211 for retrieving missed steps.

Figure 5:
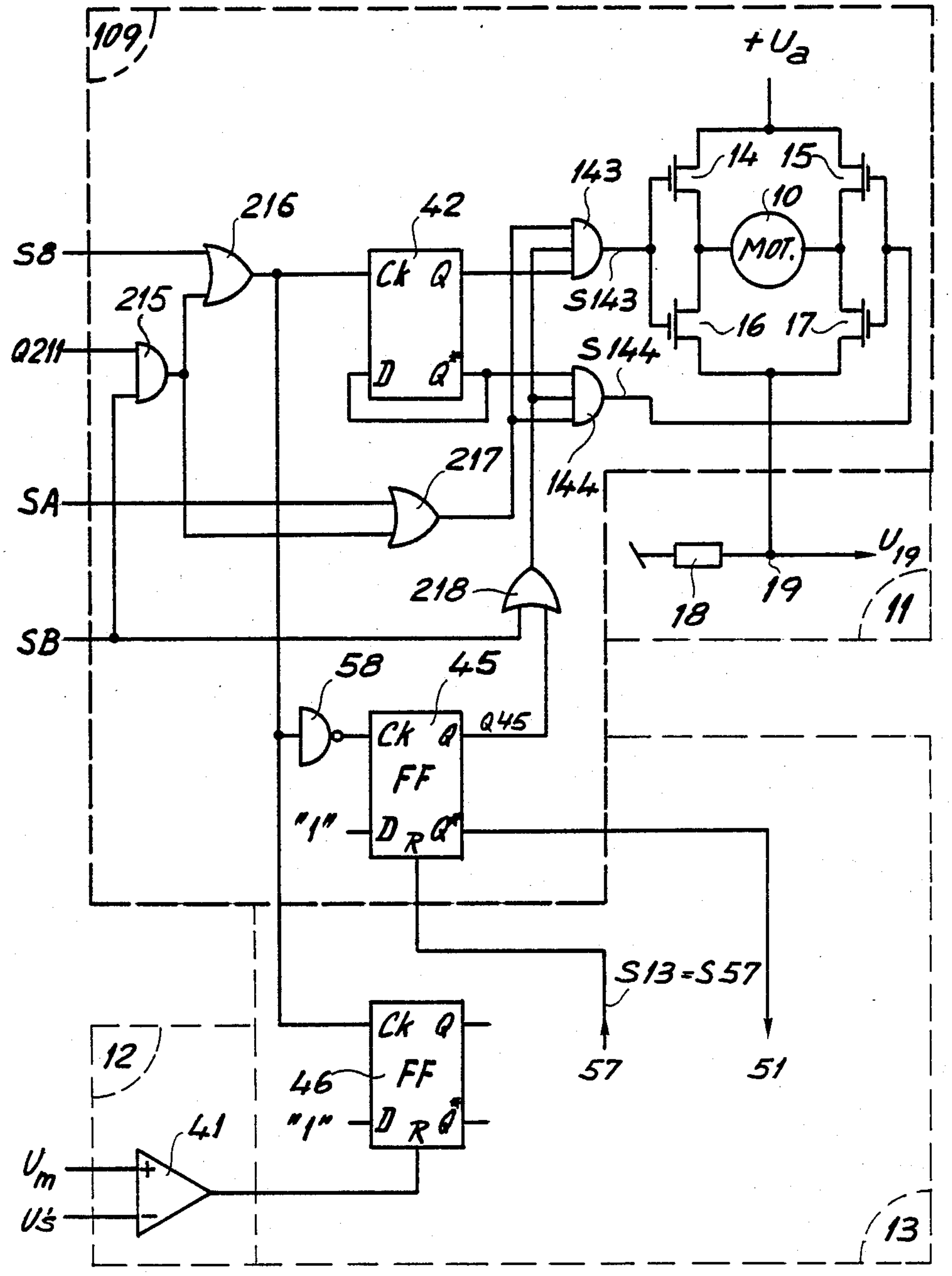
FIG. 5 is a diagram of a possible constructional form for the stepping motor control circuit shown in the FIG. 1 block diagram.

A resistor 18, shown in FIG. 5 and connected in series with motor 10, causes a voltage $U_{19}$ to appear across its terminals, representative of the current flowing through the motor during a drive pulse I.

A calculating circuit 11, shown in FIG. 11 of EP Specification No. 0060806, receives signal $U_{19}$ on its input and generates a measurement voltage $U_m$ representative of the voltage that is induced by the rotor during rotation and which is issued by the output of the circuit, across the terminals of resistor 82 in EP Specification No. 0060806.

A comparing circuit 12 has a first input connected to the output of circuit 11 and a second input receiving a reference or threshold voltage $U_s'$. Comparator 12 supplies at its output a logic signal S12 which is low when $U_m$ is smaller than $U_s'$ and high when $U_m$ is greater than $U_s'$. Threshold voltage $U_s'$ is chosen in dependence on the amplitude of the measurement voltage $U_m$ which occurs under normal operating conditions of the motor, as will be described later. The transition instant at which signal S12 switches from low to high, measured from the beginning of drive pulse I, defines a time $T_2$ representative of the torque C supplied by motor 10.

The output of comparator 12 is connected to one input of a calculating circuit 13 which determines the duration of drive pulse I, and the output of frequency divider 400 is connected to a second input of circuit 13. A logic signal S13 is supplied by the output of circit 13. Signal S13 is generated by circuit 13 from signals S8 and S12 and is applied to the second input of control circuit 109. Signal S13 is normally low and goes high $T_3$ seconds after the switching of signal S12. Signal S13 when high causes drive pulse I produced by control circuit 109 to stop. Duration $T_1$ of the drive pulse therefore takes into consideration the torque C of motor 10 and has a value $T_1=T_2+T_3$.

The output of circuit 11, issuing measurement voltage $U_m$, is connected to the input of a circuit 200 for detecting missed steps. The output of circuit 200 is connected to the third input of circuit 109 and to the input of a circuit 201 for counting missed steps. The output of circuit 200 issues a logic signal Q211 which is normally low and which goes high for, e.g., one second after detecting a missed step. The output of counter 201 is connected to one input of a voltage reference circuit 202. The output of circuit 202, which supplies threshold voltage $U_s'$, is connected to the second input of circuit 12. Signal S220 issued by the output of counter 201 is made up of pulses. One pulse is generated after circuit 201 has counted N missed steps in Tn seconds. Typically N=5 and Tn=8 s.

At each pulse of signal S220, circuit 202 increments threshold voltage $U_s'$ by one fixed step. Voltage $U_s'$ can therefore vary between a minimum level $U_{s0}'$, which can be equal to 0, and a maximum level $U_{sP}'$ in P steps. P may for example be 10. When $U_s'$ has reached its maximum level, it remains at that level even if circuit 202 receives further pulses. Circuit 202 has a second input to which a signal S226 is applied. This signal returns voltage $U_s'$ to its minimum value $U_{s0}$ each time the whole circuit shown in FIG. 1 is subjected to a voltage, e.g. when the battery is being changed. Voltage $U_s'$ is also periodically reduced to $U_{s0}'$, e.g. once every hour, by signal SD which is generated by combinative logic circuit 203 and which is applied to a third input of circuit 202.

The operation of the device shown in FIG. 1 is best explained if it is split into two loops. Excluding circuits 8 and 203, which form no part of the loops, the first or lower loop includes elements 109, 10, 11, 12 and 13, and the second or upper loop includes elements 109, 10, 11 and 200 with in addition a branch consisting of elements 201 and 202.

Figure 4:
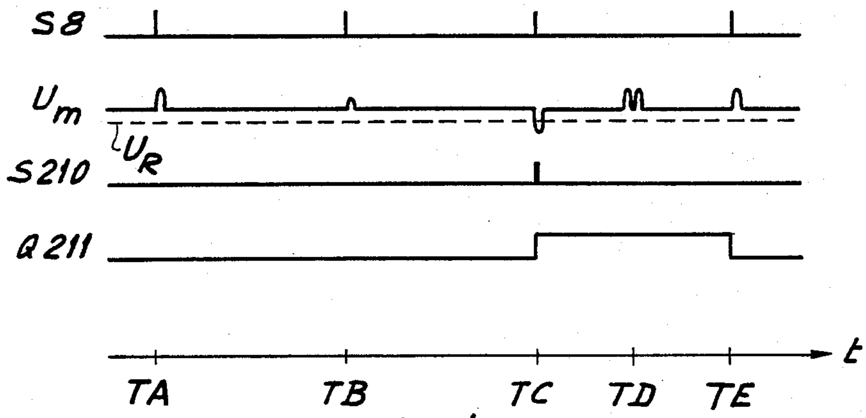
FIG. 4 shows the shape of the main signals appearing in the FIG. 3 circuit.

Ignoring the retrieval of the missed steps and assuming threshold voltage $U_s'$ to be constant, the lower loop is equivalent to the FIG. 4 diagram of EP Specification No. 0060806, circuit 109 being replaced by circuit 9. In that specification, elements and circuits 9, 10, 11, 12 and 13, and also the operating of the device as a whole are explained and described in detail. This device serves to adapt in an optimal way the duration $T_1$ of drive pulse I to the torque C having to be produced by the motor by measuring the time $T_2$ taken by measurement voltage $U_m$ to reach threshold voltage $U_s'$. But this optimal operation, corresponding to minimum energy consumption of the motor, is only achieved if characteristics k and K of the motor are the same as those to which calculating circuit 13 is subjected, this circuit defining, on the basis of time $T_2$, a time $T_3$ which when added to time $T_2$ sets the duration $T_1$ of drive pulse I.

During production, the characteristics of the motor, the circuit 13 and the other circuits in the lower loop inevitably display certain discrepancies. Minimum energy consumption conditions for the motor are therefore rarely achieved in practice, even less so if the motor is replaced by another model having different characteristics. This causes serious restrictions in the use of such a control device.

The upper loop for the retrieval of missed steps, in conjunction with the branch made up of circuits 201 and 202 and which controls threshold voltage $U_s'$, makes it possible largely to do away with the need to match the constants of circuit 13 with constants k and K of motor 10 and hence to render the device less sensitive to variations in the parameters of the other circuits.

Missed step counter 201 enables a criterion of satisfactory motor operation to be determined when the motor is subjected to outside interference. For example, if the motor, after being subjected to angular shocks or to an intense magnetic field, does not miss more than 4 steps per period of 8 seconds, the energy of drive pulses I may be deemed sufficient. No pulse wll then be generated by circuit 201 and threshold voltage $U_s'$ will remain unchanged. If however the number of steps missed per period of 8 seconds exceeds 4, the energy of the drive pulses is deemed insufficient. One or more pulses will then be generated by circuit 201, set to operate with constants N=5 and $T_n=8$ seconds. Each pulse on signal S220 causes threshold voltage $U_s'$ of circuit 202 to be incremented by one step. Now, assuming all other parameters remain unchanged, an increased voltage $U_s'$ will cause drive pulses I to have increased energy. This adaptation process can continue until the energy of the drive pulses is sufficient to satisfy the chosen criterion for satisfactory operation. All steps missed during this period of adjustment are of course retrieved. To take into account the evolution of the motor characteristics with time, whenever the battery is replaced, or periodically, e.g. once every hour, voltage $U_s'$ is reset to the minimum value $U_{s0}'$ by means of signals S226 or SD. The value of $U_s'$, after the readjustment process, corresponds to the new motor operation conditions.

The way circuit 11 reacts to a drive pulse I applied to motor 10 in various situations will now be described. In the present case, the motor is of the stepping type and drive pulses I are polarised. Therefore, for the motor to rotate by one step from a given position, drive pulse I must have the right polarity with respect to the position of the rotor, i.e. be in phase with it. If pulse I has the wrong polarity, i.e. is in counterphase with respect to the position of the rotor, the motor will not rotate.

Three cases will now be considered. In each case the measurement voltage $U_m$ generated by circuit 11, corresponding to the FIG. 11 circuit of EP Specification No.

Figure 2:
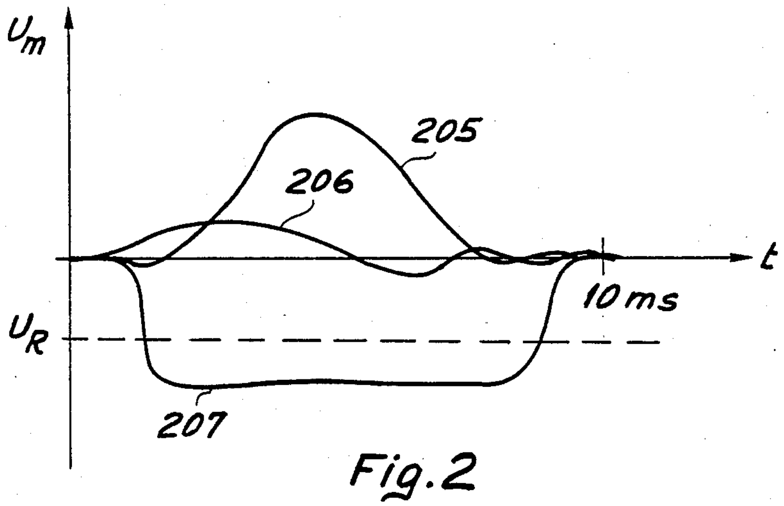
FIG. 2 shows the voltage issued by an induced voltage measuring circuit forming part of the FIG. 1 device firstly when the motor rotates normally, secondly when the rotor is blocked and the drive pulse is in phase, and thirdly when the drive pulse is in counterphase.

0060806, is depicted as a curve in FIG. 2. The first case is the normal one, wherein motor 10 receives a drive pulse I that is in phase and effects a step. The measurement voltage $U_m$ depicted as curve 205 in FIG. 2 closely reflects the voltage induced by the rotation of the motor. This curve is characterized by a marked positive peak. The second case is when motor 10 receives a pulse I that is in phase, but does not rotate, its rotor being blocked. The induced rotation voltage is then nil, while the measurement voltage $U_m$ that is generated in this case by circuit 11, shown as curve 206, has an oscillation of low amplitude. In the third case, motor 10 receives a pulse I that is in counterphase. It cannot then rotate and the induced voltage is therefore also nil. However, measurement voltage $U_m$ becomes markedly negative as depicted by curve 207 in FIG. 2. This is due to the fact that the magnetic flux produced by the magnet of the rotor and that produced by pulse I are added to each other and saturate certain parts of the stator. This saturation causes a change in the time constant L/R of the motor, L being the inductance of the motor and R the resistance of the coil. Now this time constant is used in circuit 11 to determine $U_m$. Thus in the case where drive pulse I is in counterphase, circuit 11 produces an erroneous but easily detectable measurement voltage $U_m$. It need only be compared with a negative reference voltage $U_R$. If the resulting voltage is positive the motor has rotated and if it is negative the motor has missed a step.

Thus, if the motor misses a step due to the rotor being blocked, the following drive pulse I, being in counterphase, will enable the missed step to be easily detected. As the drive pulse I in counterphase cannot cause the motor to rotate, two steps will be missed in all.

Figure 3:
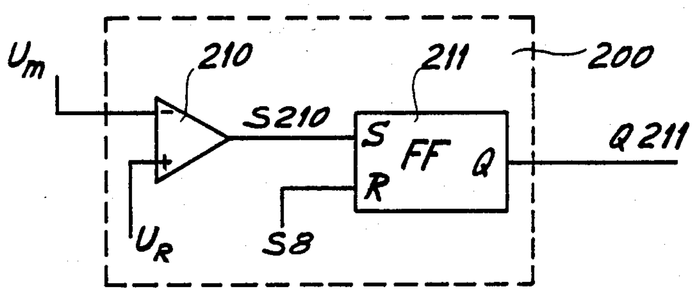
FIG. 3 is a diagram of a circuit for detecting missed steps used in the control device shown in FIG. 1.

FIG. 3 is a detailed diagram of the missed step detection circuit 200. This circuit comprises a differential amplifier 210 whose output is connected to the set input S of a flip-flop 211. The non-inverting input of amplifier 210 is connected to a voltage reference, not shown, generating a negative voltage $U_R$. The inverting input of amplifier 210 also acts as the input of circuit 200. This input is connected to the output of circuit 11 to receive measurement voltage $U_m$. Flip-flop 211 has a reset input R connected to the output of frequency divider 400 to receive signal S8. The output Q of flip-flop 211 also acts as the output of circuit 200.

The operation of the FIG. 3 circuit will now be described with reference to the FIG. 4 signals present in the various parts of the circuit. Signal S8 is issued by the output of frequency divider 400 and is made up of short, 1 Hz pulses. The duration of these pulses is equal to the period of the 32768 Hz signal issued by quartz oscillator 300. Voltage $U_m$ is made up, in synchronism with the pulses of signal S8, of pulses which are positive when drive pulse I is in phase with the position of the rotor of the motor, whether the latter rotates or not, and negative when pulse I is in counterphase. The comparison between voltage $U_m$ and negative reference voltage $U_R$ performed by differential amplifier 210 causes a signal S210 to be issued. If the gain of amplifier 210 is sufficiently high, signal S210 will be low when $U_m$ is greater than $U_R$ and high while $U_m$ is less than $U_R$. Signal S210 therefore includes a positive pulse of a few milliseconds, which slightly lags behind the pulses of signal S8, when a missed step of the motor is detected.

Flip-flop 211 receives on its R and S inputs signals S8 and S210 respectively. Signal S8 resets the flip-flop to zero every second, which causes its output Q to go low. At each positive pulse of signal S210, the flip-flop is set, causing output Q to go high until the next pulse of signal S8. Logic signal Q211 issued on output Q of flip-flop 211 is therefore normally low. It goes high when a missed step has been detected, then goes low again one second later.

The instants corresponding to the various above described operative conditions of motor 10 are noted on time scale t in FIG. 4. At instant TA motor 10 receives an in-phase drive pulse I and rotates normally. The rotor of the motor is assumed to be blocked at instant TB when the in-phase drive pulse I produces a voltage $U_m$ of lower amplitude than before. The following drive pulse I, at instant TC, is then issued in counterphase, the motor cannot rotate, whether or not the rotor be blocked, and the voltage $U_m$ that is produced is negative. This causes signal Q211 to go high. Approximately half a second later, at instant TD, while signal Q211 is still high, the motor receives, by means described later, two correcting drive pulses producing the two neighboring positive pulses of measurement voltage $U_m$. The watch has then retrieved the two missed steps. Again half a second later, at instant TE, the motor receives an in-phase drive pulse I and rotates normally.

FIG. 5 of the accompanying drawings is to be considered in conjunction with FIG. 12 of EP Specification No. 0060806. Both these Figures comprise blocks 11, 12 and 13 that have previously been discussed. Block 9 in FIG. 12 is however replaced by block 109 in FIG. 5. Block 109 shows the structure of the control circuit of motor 10. This block has the same general structure as block 9, with however a few changes and a few new elements.

The purpose of these changes is two-fold. First, they serve to interrupt drive pulses, after a set time, whenever stopping signal S13=S57 is not issued. This can occur if measurement voltage $U_m$ is not high enough to trigger signal S13 as a result, for example, motor 10 being blocked. Secondly, these changes enable two correcting drive pulses to be issued between two normal drive pulses whenever a missed step has been detected. In both these cases, the duration of drive pulses I is fixed and corresponds to the optimal duration, i.e. that during which the motor can transmit maximum torque. For a watch stepping motor, the optimal duration is typically 7.8 ms which is equal to the period of a 128 Hz signal. It is this value which will be referred to hereafter.

The circuit shown in block 109 of FIG. 5 of the accompanying drawings comprises elements 10, 14, 15, 16, 17, 42, 45 and 58 previously described in EP Specification No. 0060806, AND gates 143 and 144 which have one input more than AND gates 43 and 44 in the EP specification, and one extra AND gate 215 and three extra OR gates 216, 217 and 218.

The output of frequency divider 400 is connected to the first input of OR gate 216 in FIG. 5. This input thus receives the 1 Hz signal S8. The output of the missed-step detection circuit 200 is connected to the first input of two-input AND gate 215 which therefore receives signal Q211. The output of AND gate 215 is connected to the second input of OR gate 216. The output of OR gate 216 is connected to the clock input Ck of flip-flop 42, to the input of AND gate 58 which acts as an inverter, and to the clock input Ck of flip-flop 46, the latter forming part of block 13. The first input of OR gate 217 is connected to the terminal of combinative circuit 203 generating logic signal SA. The second inputs of two-input AND gate 215 and two-input OR gate 218 are connected to each other and to the output of circuit 203 generating logic signal SB. The second input of OR gate 217 is connected to the output of AND gate 215 and the first input of OR gate 218 is connected to output Q of flip-flop 45. The output of OR gate 218 is connected to the second inputs of three-input AND gates 143 and 144. The third inputs of AND gates 143 and 144 are connected to the output of OR gate 217. The first input of AND gate 143 is connected to output Q of flip-flop 42 and the first input of AND gate 144 to output Q* of flip-flop 42. Finally, the outputs of AND gates 143 and 144 are connected to the control transistors 14, 15, 16 and 17 of motor 10, and terminals Q* and R of flip-flop 45 are respectively connected to elements 51 and 57 of block 13, as described in EP Specification No. 0060806.

Figure 6:
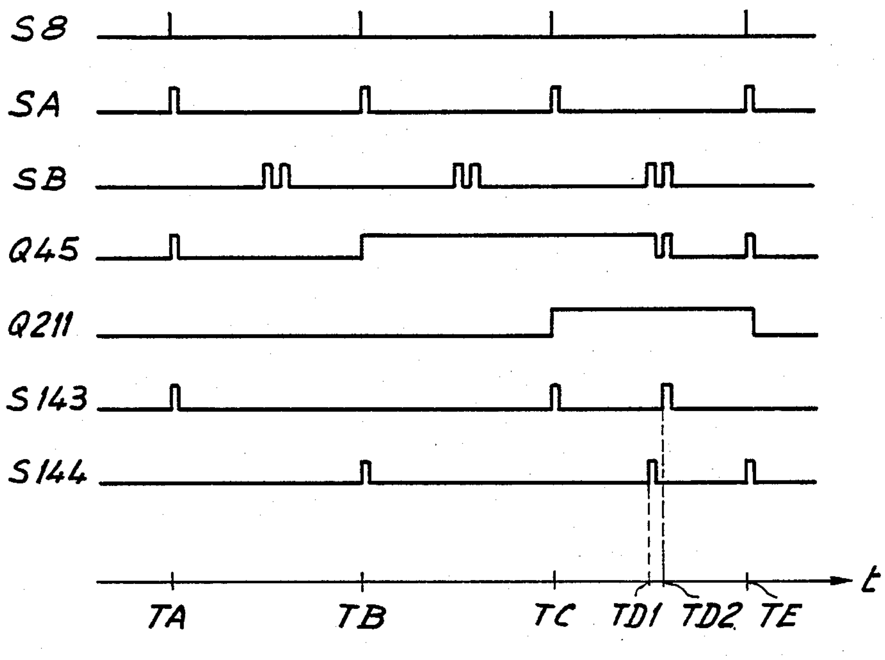
FIG. 6 shows the shape of the main signals appearing in the FIG. 5 circuit.

Before describing the operation of the FIG. 5 circuit, the signals shown in FIG. 6, which are received by the circuit, will be detailed. Signal S8, described in the EP specification, is composed of positive pulses recurring every second and having a duration of approximately 30 μs. Signal SA also consists of 1 Hz pulses, synchronous with the pulses of signal S8, but having a duration of 7.8 ms. Signal SB is made of a series of pairs of pulses. Each pulse of signal SB lasts 7.8 ms and each pair of pulses occurs between two successive pulses of signal S8. In the example shown in FIG. 6, the pulses of signal SB forming a pair are separated by an interval of 7.8 ms and each pair of pulses occurs at the mid-point of the interval between two successive pulses of signal S8. Signal Q45 has been described in EP Specification No. 0060806 when the motor rotates normally. This signal is then made up of positive pulses having a duration which determines that of drive pulses I and which varies as a function of the torque of the motor. When the motor is blocked and misses one step, the amplitude of measurement signal $U_m$ is insufficient to reach threshold volage $U_s'$ and generate signal S13 to reset flip-flop 45. Signal Q45 then stays high until the appearance of the next correcting drive pulse, whose fixed duration of 7.8 ms is assumed long enough to cause the motor to rotate even in the most unfavorable circumstances. Signal Q211 has been described in connection with FIGS. 3 and 4. This signal goes high after detecting a missed step, and remains high until the following pulse of signal S8. Signals S143 and S144 are the signals issued to control transistors 14, 15, 16 and 17 of motor 10 in the case of normal operation and in the case of retrieval of missed steps. Except for the pairs of correction pulses, the start of all other pulses is synchronous with the start of the signal S8 pulses. Finally, time scale t shows, as in FIG. 4, a normal rotation of the motor at TA, a missed step at TB, the detection of a missed step at TC, the two correction steps at TD1 and TD2, and a gain a normal rotation step at TE.

The operation of circuit 5 and in particular of block 109 will now be described with reference to the FIG. 6 signals. When the motor operates normally, signal Q211 is low as no step has been missed. The output of AND gate 215 then also remains low, whether signal SB is high or low. OR gate 216 then transmits, without changing it, signal S8 which is thus applied to terminals Ck of flip-flops 42 and 46 and to the input of gate 58.

The output of OR gate 217 issues a signal consisting of signal SA during normal operation and of the superposition of signals SA and SB just after a missed step has been detected. Similarly, the output of OR gate 218 issues a signal consisting of the superposition of signals SB and Q45. Normal drive pulses I, which are received in synchronism with signal S8, are issued when signal SB is low. In this case, signal SB therefore has no effect on OR gate 218 which then only transmits signal Q45 which defines the duration of drive pulse I. Thus, when a normal drive pulse I is issued, the signal at the output of OR gate 217 is high for 7.8 ms and the signal at the output of OR gate 218 is also high, but only for the duration of the signal Q45 pulse. When the motor load is normal, the duration of the signal Q45 pulse is approximately 4 ms, far less than the 7.8 ms duration of the signal SA pulse. These signals being applied to AND gates 143 and 144, the signal Q45 pulse appears again on the output of gate 143 if the output Q of flip-flop 42 is high and on the output of gate 144 if instead the output Q* of flip-flop 42 is high. Consequently, signal S143 at the output of AND gate 143 has a period of 2 seconds and is made up of pulses which occur half way between two successive pulses of the similar signal S144 issued by AND gate 144. Signals S143 and S144 are applied to control transistors 14 to 17 which generate drive pulse I.

Thus, when the motor works under normal conditions, block 109 of FIG. 5 of the accompanying drawings operates in an identical way to block 9 of FIG. 12 of EP Specification No. 0060806. This situation corresponds to instant TA on the time scale t of FIG. 6.

The case where the motor fails to rotate in response to an in-phase drive pulse I and hence misses one step, will now be described. This corresponds to instant TB on the time scale t of FIG. 6. Under such circumstances, measurement voltage $U_m$ remains lower than threshold voltage $U_s'$, as explained earlier. Signal S12 issued by block 12 then stays low. Blok 13, by not receiving a control pulse from block 12, cannot in turn generate signal S13 which would stop drive pulse I by causing a signal Q45 to switch from high to low. Thus, the motor being blocked, drive pulse I once triggered, would last indefinitely in the case of block 9 of the EP specification. But with block 109 of the present specification, even if signal Q45 stays permanently high, drive pulse I cannot last longer than the 7.8 ms of the signal SA pulse. This is because signal SA, via OR gate 217, so controls AND gates 143 and 144 as only to allow the signals applied to their inputs to be issued at their outputs during the time when signal SA is high.

The motor having missed a step, the following drive pulse I arrives in counterphase and is therefore unable to cause the motor to rotate. This corresponds to instant TC on the time scale t of FIG. 6. Circuit 200, at that instant, enables the non-rotation of the motor during the previous drive pulse to be detected by causing output signal Q211 to switch from low to high. Signal Q211 will stay high until the next pulse of signal S8 at instant TE of the time scale t of FIG. 6, thus defining a time slot of 1 second.

Just after instant TC of FIG. 6, the motor will thus have missed two steps which must be retrieved before instant TE, e.g. at the midpoint of the time interval between TC and TE, at instants TD1 and TD2 defined by the corresponding pair of pulses of signal SB. Signal Q211 is then high thereby enabling the two pulses of signal SB to pass through AND gate 215 and OR gate 216 and to be applied to the input Ck of flip-flop 42 of FIG. 5. Signal SB then also passes through OR gate 217 to reach the third inputs of AND gates 143 and 144. The first pulse of signal SB sets flip-flop 42 in a state enabling an in-phase drive pulse to be generated at instant TD1, since the drive pulse at instant TC was in counterphase and the motor had not rotated. In the case shown in FIG. 6, it is the output Q* of flip-flop 42 which must go high. As signal SA is low around instants TD1 and TD2, only the two pulses of signal SB appear at the output of OR gate 218. Also, at instant TD1 the output signal of OR gate 218 is high since logic signals SB and Q45 are also high. Consequently, at instant TD1 signal S143 is low and signal S144 is high. An in-phase drive pulse I is then generated by control transistors 14 to 17. The rotation of the motor causes signal Q45 to go low approximately 4 ms after the beginning of the drive pulse as in the normal case. This transition of signal Q45 does not however cause drive pulse I to be stopped when a missed step is being retrieved. This is because the two pulses of signal SB, which determine the duration of the drive pulses, i.e. 7.8 ms, then appear at the outputs of OR gates 217 and 218. At instant TE, after having retrieved the two missed steps, the motor again operates normally.

Figure 7:
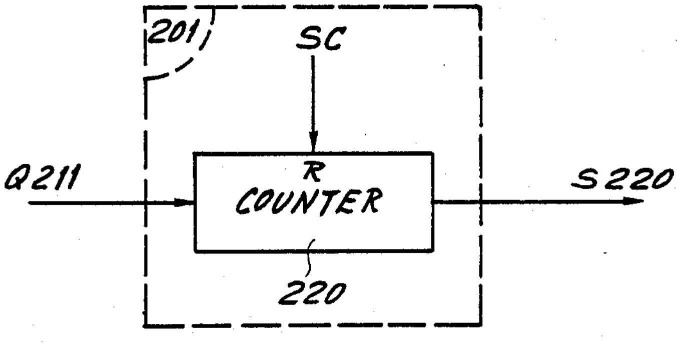
FIGS. 7 and 8 are diagrams respectively of a missed step counter and of a circuit supplying a variable threshold voltage $U_S'$, used in the device shown in FIG. 1.

The circuit 201 for counting missed steps, shown in FIG. 7, will now be described. It basically comprises a counter by N 220. The value of N is typically 5. The counter has an input terminal, an output terminal and a reset input R.

The input receives signal Q211 from missed step detector 200. The output issues a signal S220, consisting of a pulse of arbitrary duration, each time the counter has counted N missed steps. Finally, input R receives from the output of circuit 203 a reset signal SC having a period $T_n$ of, for example, 8 seconds. Thus, if 5 or more steps have been missed during a period of 8 seconds, output signal S220 will have a pulse at the end of that period. The pulses of signal S220, shown as A, B, . . . , P in FIG. 9, obviously appear at irregular intervals in time. Of course, all of the missed steps are retrieved.

Figure 8:
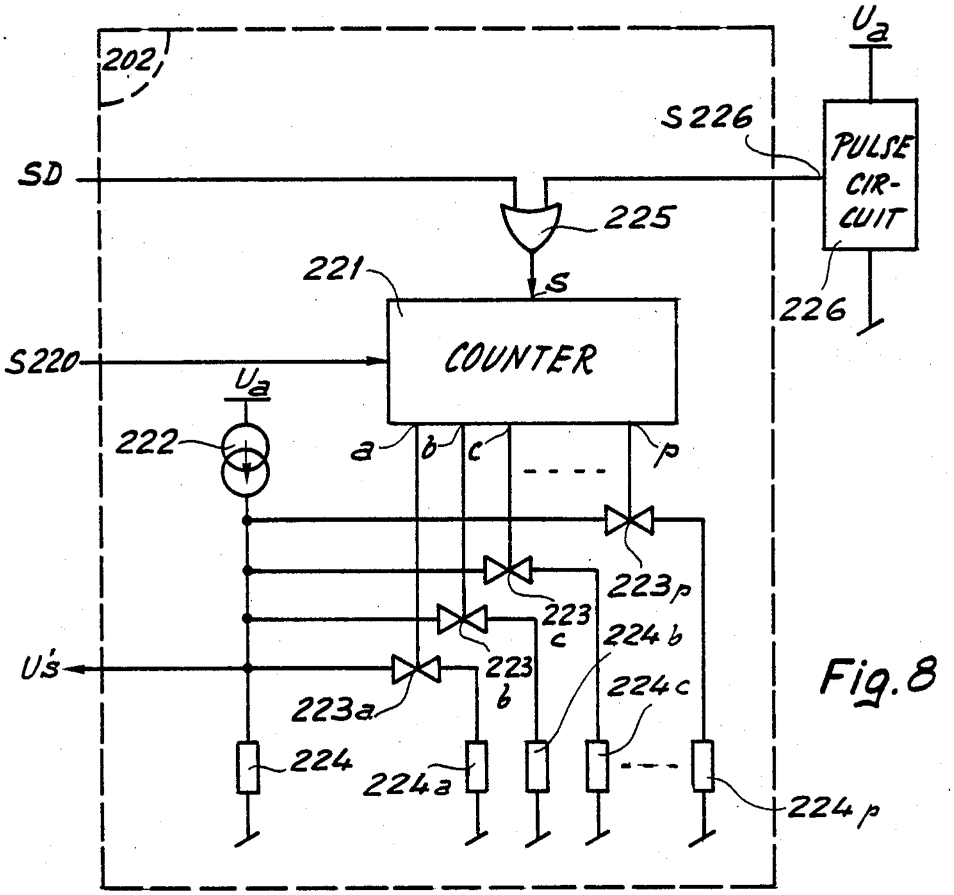

Turning now to voltage reference circuit 202, shown in FIG. 8, this circuit comprises a counter by P 221 having an input terminal, a set terminal S, and p output terminals a, b, c, . . . , p. The value of P is typically 10. The input receives signal S220 from missed-step counting circuit 201, and set terminal S is connected to the output of a two-input OR gate 225. The first input of gate 225 receives signal SD, generated by circuit 203, which produces, e.g., one pulse per hour. The second input is connected to a circuit 226, not described but known, which issues an output signal S226 containing a pulse at the moment when the battery providing supply voltage $U_a$ is fitted into the watch. Outputs a, b, . . . , p of counter 221 are each connected to the control terminal of a transmission gate, these transmission gates being referenced 223*a*, 223*b*, . . . , 223*p*. Each transmission gate connects one terminal of a first load resistor 224, common to all of these gates, to one terminal of a second load resistor. To each transmission gate therefore corresponds a second load resistor and these p resistors are respectively referenced 224*a*, 224*b*, . . . , 224*p*. The other terminals of resistors 224, 224*a*, 224*b*, . . . , 224*p* are all grounded. A transmission gate becomes conductive when its control terminal goes high; otherwise it is non-conductive. Between supply terminal $U_a$, which is connected to the battery of the watch, and the first terminal of resistor 224 is connected a current source 222.

Figure 9:
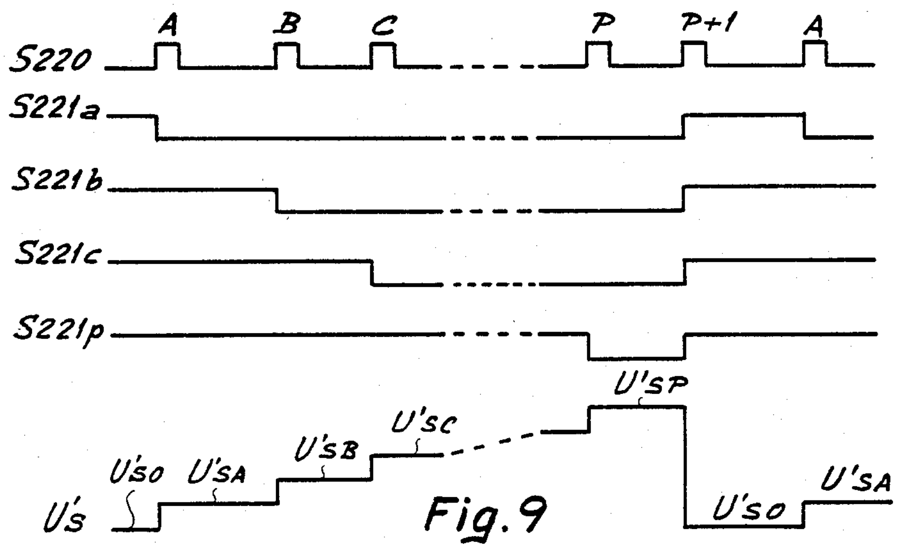
FIG. 9 shows the shape of the main signals appearing in the FIGS. 7 and 8 arrangements, particularly the variation of the threshold voltage $U_S'$ as a function of time and of missed steps.

The operation of the FIG. 8 circuit will now be described with reference to the signals shown in FIG. 9. FIG. 9 shows the variations of signals S221*a*, S221*b*, . . . , S221*p* issued by the outputs a, b, . . . , p of counter 221 as a function of pulses A, B, . . . , P contained in signal S220, and shows the resulting variations in threshold voltage $U_s'$. At the initial instant counter 221 is reset by a pulse of signal S220 or of signal SD, this pulse being issued to terminal S of the counter via OR gate 225. Signals S221*a*, S221*b*, . . . , S221*p* are then all high. Transmission gates 223*a*, 223*b*, . . . , 223*p*, which are controlled by these signals, thus all become conductive. Consequently, load resistors 224*a*, 224*b*, . . . , 224*p* are all acting in parallel with load resistor 224. The setting in parallel of all these resistors defines a minimum equivalent load resistance. Current source 222, which issues a constant current IR through this equivalent load resistance, generates at its terminals a minimum threshold voltage $U_{s0}'$. If the energy of drive pulse I corresponding to this threshold is insufficient for the motor to operate satisfactorily according to the criterion set forth earlier, a pulse A will be generated by circuit 201 and transmitted by signal S220 to counter 211, which will be incremented by one unit. In this new state of counter 221, output signal S221*a* goes low, the other outputs remaining high. Transmission gate 223*a* then switches from a conductive to a non-conductive state and disconnects resistor 224*a* from resistor 224. The equivalent load resistance thus increases. The same applies to the threshold voltage which increases from $U_{s0}'$ to the next value up, $U_{sA}'$. The same process will recur, if necessary, with pulses B, C, . . . , P, the threshold voltage being each time incremented by one step until it reaches maximum value $U_{sP}'$. Pulse P+1 will cause the threshold voltage to return to its minimum value $U_{s0}'$, and the cycle can then start again. In practice, the threshold voltage must stabilize at a level lower than $U_{sP}'$, the return to minimum value $U_{s0}'$ being only brought on by the pulses of signals S226 or SD.

Of course, the invention is not limited to the particular form of embodiment described above. For example, in this form of embodiment, threshold voltage $U_s'$ is periodically reset to its minimum value $U_{s0}'$, in order to, on the one hand, enable it to be decreased in the event that, due to external interference, the rotor misses a number of steps greater than N with the result that the voltage reaches too high a value and, on the other hand, enable the control device to adapt automatically to the possible variations in the motor's characteristics and operating conditions in time.

It would clearly be within the scope of the invention to return the reference level to its minimum value only when the control circuit is subjected to a voltage. The threshold voltage could even only be set to the value $U_{s0}'$ when the motor is started for the first time. Such solutions would of course be less satisfactory but would however still be an improvement over the known systems in which the reference is fixed.

Rather than periodically resetting the threshold voltage to its minimum value, it is possible to decrement it progressively, step by step, until motor stoppages occur and, if the stoppages become too frequent, to re-increment it.

Furthermore, missed-step counting circuit 201 is designed to avoid hasty increases in the threshold voltage level as soon as a step is missed by the rotor, this being possibly due to a shock or an external magnetic field and not to the fact that the threshold level is too low. This circuit is therefore particularly useful in the two cases mentioned above, i.e. when the reference voltage is set to its minimum value only when the device is operated for the first time, or when it is reset to this value only when the battery is changed. Without this counter, the threshold voltage, by being applied directly to circuit 202 by signal Q211, could indeed very soon reach its maximum value and cause the energy consumption of the motor to be unnecessarily high during the whole lifetime of the watch, or at least the lifetime of a battery. On the other hand, if the control device is so designed that the reference level is frequently readjusted, counting circuit 201 can then be dispensed with without great loss, by connecting the output of circuit 200 to the first input of circuit 202, since the energy that is used can then only be excessive for a limited period. Further, energy losses can always be decreased by increasing the frequency of readjustment of the reference level.

This invention is also applicable to any parameter representative of the operation of the motor, other than the voltage induced by the motion of the rotor. It could apply to the overall induced voltage, including the self-inductance of the coil, to the current flowing through the motor, to the variation in the magnetic flux in the stator, or to any variable obtained as a result of mathematical operations involving these parameters.

The block diagram in FIG. 1 would remain applicable for these various alternatives, except for the missed-step counting circuit which, as mentioned above, can in certain cases be dispensed with, and the circuit for calculating the duration of the drive pulses, which is not always necessary, as the interruption of the pulses can in some cases be controlled directly by the output of the comparator. The other circuits, in particular measurement circuit 11 and missed-step detecting circuit 200, would of course have to be adapted to the physical magnitude that is chosen as the representative parameter. For example, when it is the variation in the magnetic flux of the coil that is chosen as the parameter, circuit 11 could be one of those described in the specification of German patent application No. 3132304.

In the above described form of embodiment of the control device according to the invention, the physical magnitude that has been chosen to adjust the duration of the drive pulses is also used to detect missed steps. This is not essential, as two different parameters can be used for each purpose. If this is the case, the input of missed-step detection circuit 200 would be connected no longer to the output of measurement circuit 11, but directly to the coil of the motor or to the control circuit of the motor.

We claim:

1. A method of controlling a stepping motor having a rotor and a coil arranged to receive from a control device associated with the motor normal drive pulses for driving the rotor when the control device is supplied with a voltage, said method comprising measuring during each normal drive pulse a physical magnitude representative of the motion of the rotor, interrupting said drive pulse at an instant determined by the time taken by the physical magnitude to reach a reference level, and, additionally, detecting whether or not the rotor has rotated in response to said normal drive pulses and modifying said reference level according to information provided by such detection.

2. A method as in claim 1, wherein said reference level is adjustable step by step between a minimum value and a maximum value and is increased by one step when N steps not effected by the rotor in response to normal drive pulses have been detected over a fixed time span, N being an integer greater than or equal to 1.

3. A method as in claim 2, wherein said reference level is adjusted to said minimum value when the control device is first subjected to a voltage.

4. A method as in claim 2, wherein said reference level is returned to said minimum value each time the control device is supplied with to a voltage.

5. A method as in claim 4, wherein said reference level is also periodically returned to said minimum value after the control device has received a voltage.

6. A method as in claim 2, further comprising applying to the motor coil corrective drive pulses of sufficient duration to enable the rotor to retrieve each step that has not been effected in response to a normal drive pulse.

7. A method as in claim 1, wherein the measured physical magnitude is the voltage induced in the coil by the motion of the rotor.

8. A method as in claim 1, wherein the measured physical magnitude is the variation of the magnetic flux flowing through said coil.

9. A device for controlling a stepping motor, comprising signal generating means for producing an output signal each time the rotor has to effect a step, control means for applying normal drive pulses to the coil of the motor in response to the output signals issued by said signal generating means, means coupled to the motor for measuring during each normal drive pulse a physical magnitude characteristic of the motion of the rotor and for issuing a measurement signal representative of said magnitude, means for producing a reference signal corresponding to a reference level for said measured physical magnitude, comparison means for supplying a signal which is a comparison between said measurement signal and said reference signal, means for receiving said comparison signal and for interrupting said normal drive pulse at a particular instant determined by the time taken by said physical magnitude to reach said reference level, and means for detecting whether or not the rotor has rotated in response to said normal drive pulses connected to said reference signal producing means for modifying the value of said reference signal according to the information supplied by said detection means.

10. A device as in claim 9, wherein said detection means are adapted to detect the steps which the rotor has failed to effect in response to normal drive pulses, and said reference signal producing means are adapted to modify the value of said reference signal step by step between a minimum value and a maximum value, the value of said reference signal being increased by one step each time N steps that have not been effected by the rotor are detected within a set time interval, N being an integer greater than or equal to 1.

11. A device as in claim 10, further comprising means for adjusting the value of said reference signal to said minimum value when a voltage is first applied to said device.

12. A device as in claim 10, further comprising means for returning the value of said reference signal to said minimum value each time said device receives a voltage.

13. A device as in claim 12, further comprising means for periodically returning the value of said reference signal to said minimum value after said device has received a voltage.

14. A device as in claim 10, further comprising means connected to said detection means for applying to the coil of said motor corrective drive pulses of sufficient duration to enable the rotor to retrieve each step that has not been effected in response to a normal drive pulse.

15. A device as in claim 10, wherein said detection means are arranged to receive said measurement signal to detect steps not effected by the rotor.

16. A device as in claim 9, wherein the physical magnitude measured is the voltage induced in the coil by the motion of the rotor.

17. A device as in claim 9, wherein the physical magnitude measured is the variation of the magnetic flux flowing through said coil.

* * * * *